United States Patent

Robbins et al.

[15] 3,640,864

[45] Feb. 8, 1972

[54] FERRIMAGNETIC SEMICONDUCTING MATERIAL AND DEVICES MADE THEREFROM

[72] Inventors: Murray Robbins, Berkeley Heights; Raymond Wolfe, New Providence, both of N.J.

[73] Assignee: Bell Telephone Laboratories, Incorporated, Murray Hill, Berkeley Heights, N.J.

[22] Filed: Nov. 18, 1969

[21] Appl. No.: 877,748

[52] U.S. Cl. ....................252/62.3 V, 252/519

[51] Int. Cl. ....................C04b 35/00, H01b 1/06

[58] Field of Search ....................252/519, 62.31, 62.3 V; 23/134, 135

[56] References Cited

UNITED STATES PATENTS 3,448,053 6/1969 Haacke et al. ....................252/62.51

*Primary Examiner*—Douglas J. Drummond

*Attorney*—R. J. Guenther and Edwin B. Cave

[57] ABSTRACT

This discovery of a system of materials exhibiting ferrimagnetic and semiconducting properties at room temperature, makes possible the development of classes of devices not previously realizable in the absence of refrigeration. These materials in polycrystalline and single-crystal form find application in such devices as optically modulated magnetic devices, microwave amplifiers with built-in isolation and memory elements with built-in gain.

3 Claims, 8 Drawing Figures

INVENTORS M. ROBBINS
R. WOLFE
BY
Edwin B. Cave
ATTORNEY

FERRIMAGNETIC SEMICONDUCTING MATERIAL AND DEVICES MADE THEREFROM

BACKGROUND OF THE INVENTION

1. Field of the Invention

The invention finds utility in the general area of electromagnetic devices whose properties depend upon both ferrimagnetism and semiconductivity.

2. Prior Art

Ferromagnetic and ferrimagnetic semiconductors have been of experimental and theoretical interest for a number of years because of the ability to study the interaction between the spins of conduction electrons and the magnetic dipoles in solids. However, device interest in these materials has been limited by the fact that all prior materials have required refrigeration in order to realize this combination of properties. One class of materials which has been investigated in this respect is the chalcogenide spinels. Among these materials, Bongers et al. (*Journal of Applied Physics*, 40 (1969) 958) have reported that $FeCr_2S_4$ shows both ferrimagnetic and semiconducting properties up to a temperature of 195° K. This is still 100° C. below room temperature. They used this compound as an end member and studied the system $Fe_{1-x}Cd_x Cr_2S_4$ finding, however, that the Curie temperature, the magnetic ordering temperature above which the material is no longer ferrimagnetic, decreases as the composition variable, $x$, increases away from the end member of the system. They report that in these compounds silver is a P-type dopant.

There has been speculation as to the possible device application of materials possessing these properties. Methfessel and Holtzberg in U.S. Pat. No. 3,271,709, issued Sept. 6, 1966 described, generally, devices whose magnetic properties can be varied by varying the electron or hole density in the semiconducting material with the application of an electric field or irradiation by light.

SUMMARY OF THE INVENTION

The applicants here have taken $FeCr_2S_4$ as an end member and studied the system $Fe_{1+x}Cr_{2-x}S_4$. Experiments show that for these materials, the ferrimagnetic ordering temperature increases as the composition variable, $x$, increases and indeed moves to well above room temperature as the composition variable, $x$, is made greater than 0.4. Compositions for which $x$ is greater than 0.3 are ferrimagnetic at temperatures easily reached by simple refrigeration techniques. The samples, over the composition range investigated, possess magnetic moments near 1.7 Bohr magnetons per formula unit which correspond to a $4\pi M_s$ value near 1,500 gauss/cm.$^3$. In the vicinity of the ferrimagnetic ordering temperature, these samples exhibit a negative magnetoresistance effect which is the basis of some proposed device uses.

Among the many cases of devices which could make use of the properties inherent in these materials are integrated microwave circuits with active and magnetic elements in the same crystal, both temperature sensitive and field sensitive magnetoresistive devices, devices based on the modulation of the material magnetization by the injection of electrical carriers via a PN-junction or light irradiation combined memory and amplifying elements on a single chip and light-emitting diodes modulated by applied magnetic fields.

DETAILED DESCRIPTION OF THE INVENTION

Devices

Figure 4:
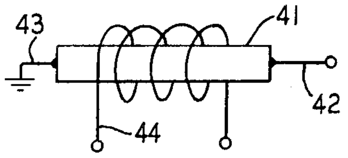
FIG. 4 is a plane view of a device making use of the magnetoresistance properties of the included material.

Several different aspects of the interaction between conduction electrons and lattice magnetic moments lead to possible device applications. Near the ferrimagnetic ordering temperature of the material, there is a marked magnetoresistance effect which is thought to be due to the ordering of lattice magnetic dipoles. Making use of this effect in single or polycrystalline material, devices such as that illustrated in FIG. 4 can be constructed in which the electric current, passing through the ferrimagnetic semiconducting sample 41 via the electrically attached conductors 42 and 43, can be modulated by the application of a magnetic field such as by passing a current through a surrounding coil 44. Such a device can also be utilized as a temperature-sensitive device because of the marked increase of the magnetoresistance effect in the neighborhood of the ferrimagnetic ordering temperature.

Figure 5:
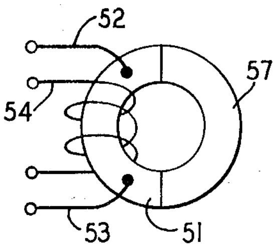
FIG. 5 is a plane view of a device in which the magnetization of the material is modulated by means of carrier injection via outside source electrodes.
Figure 6:
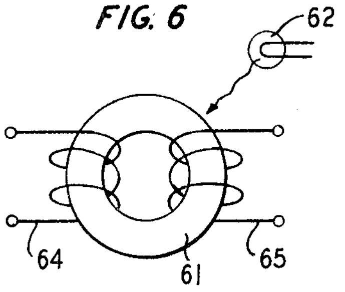
FIG. 6 is a plane view of a device in which the carrier density is modulated by irradiating the sample with light.

Another class of devices makes use of the modulation of the magnetization of the ferrimagnetic semiconducting material by the modulation of the semiconducting carrier density. In polycrystalline and single-crystal materials holes and electrons can be created by the irradiation of the material with light. In single crystal materials a PN-junction can be formed and the carrier density modulated by carrier injection under an applied electric field. Such devices are illustrated in FIGS. 5 and 6. FIG. 5 shows a ferrimagnetic semiconducting body 51 with conducting means 52, 53 for the injection of carriers into the body, a magnetic keeper 57 and a magnetic means 54 for the application and sensing of magnetic fields in the material. FIG. 6 shows such a body 61 with a modulating light source 62 and magnetic means 64, 65 for the application and sensing of magnetic fields in the body.

Figure 8:
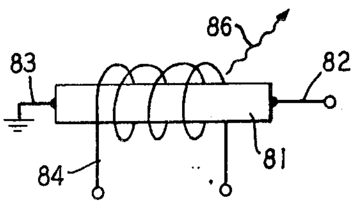
FIG. 8 is a plane view of a light-emitting diode which is modulated by an applied magnetic field.

Since suitably constructed and biased PN-junctions emit light, devices can be constructed using ferrimagnetic semiconducting materials in which this emitted light is modulated by an applied magnetic field. Such a device is shown in FIG. 8 in which the proposed electric bias is applied to the ferrimagnetic semiconducting body 81, 86 the attached electric leads 82 and 83 and the emerging light 86 is modulated by a magnetic field such as that generated by the surrounding coil 84.

Figure 3:
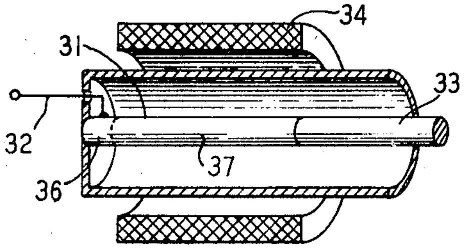
FIG. 3 is a perspective view partly in section of a microwave-amplifying device with built-in isolation.
Figure 7:
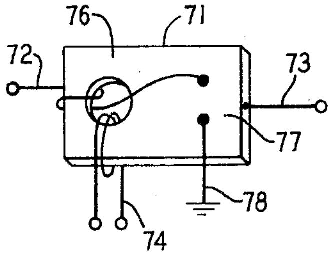
FIG. 7 is a perspective view of a magnetic memory element with an amplifying element on the same chip.

The combination of ferrimagnetic and semiconducting properties in one body combined with modern miniaturization and doping techniques will allow the construction of a multifunction network on one piece of material. Two exemplary devices are shown in FIGS. 3 and 7. FIG. 3 shows a microwave-amplifying device with a built in isolator. The ferrimagnetic semiconducting body 31 has an amplifying section 36 and an isolating section 37. Amplification is realized by he application of suitable electric bias through electrical leads 32, 33 and isolation is accomplished using the magnetic properties of section 37 which are made nonreciprocal through the use of the biasing magnet 34. FIG. 7 shows a ferrimagnetic semiconducting body 71 which has magnetic memory element region 76 and an amplifying region 77 with the electrical conducting leads arranged such that either the read signal or the write signal present in lead 72 can be amplified by the amplifying region 77 which is provided with suitable electric bias through leads 72, 73 and 78. The complementary memory function, write or read, is accomplished by the other winding 74.

Exemplary Materials

Figure 1:
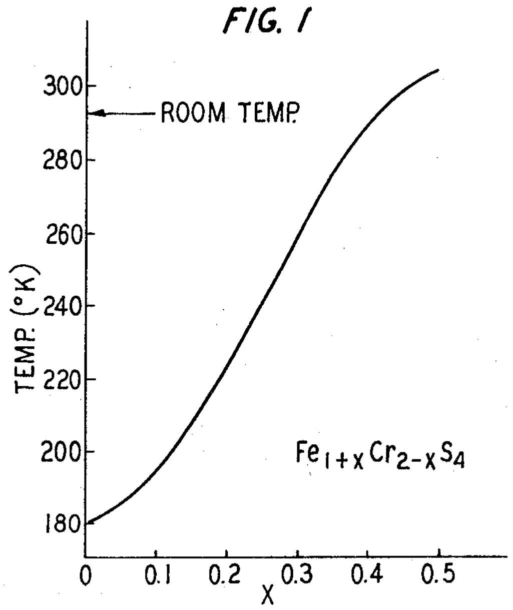
FIG. 1 is a curve which shows the ferrimagnetic ordering temperature, $T_c$, as a function of the composition variable, $x$, for the system $Fe_{1+x}Cr_{2-x}S_4$.

FIG. 1 shows the ferrimagnetic ordering temperature as a function of the material composition. This ordering temperature varies from 180° K. for the system and member $FeCr_2S_4$ to well above room temperature which was obtained for the value of composition variable, $x$=0.5. This is not a limiting composition but represents the end of the composition range for which the sample growth technique used was most effective.

Figure 2:
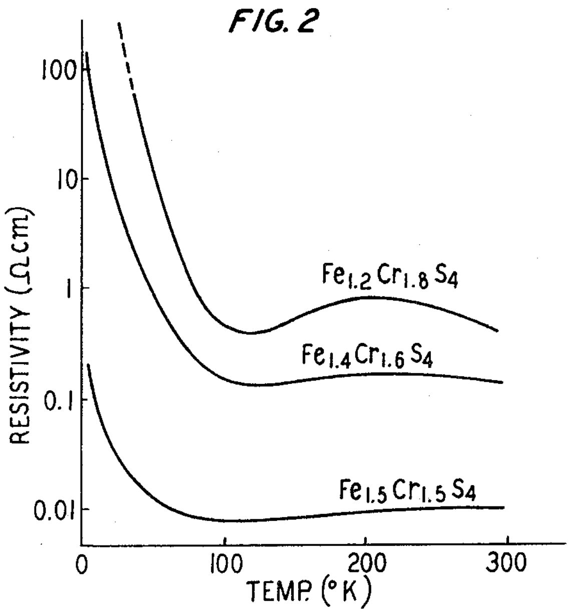
FIG. 2 shows a curve which shows the semiconducting behavior of the resistivities of three members of the $Fe_{1+x}Cr_{2-x}S_4$ system as a function of the absolute temperature.

FIG. 2 shows the resistivities of three exemplary members of the system as a function of temperature. Here the semiconducting nature of these materials is clearly evidenced by the exponential increase of resistivity with decreasing temperature at low temperature.

The samples reported here are polycrystalline materials prepared by the following process:

1. An appropriate mixture of Fe, S and $Cr_2S_3$ is pulverized and mixed in a dry milling operation;
2. The mixtures are pressed into pellets;
3. The pellets are sealed in evacuated quartz tubes which are heated to 800° C. at a rate of 15° C. per hour, held there for 48 hours and furnace cooled; and
4. The pellets are pressed again at a temperature of 700° C. and a pressure of 2 to 3 kilobars.

This technique yielded single-phase specimens up to a value of composition variable $x$=0.5 as evidenced by X-ray investigations. This value of composition variable represents a practical limit of the use of this technique in its simplest form not an intrinsic limit of the material system. The samples were of P-type except for the highest temperature specimen which was N-type as evidenced by measurements of the Seebeck effect.

Devices which incorporate PN-junctions, of course, require the growth of single-crystal materials. The growth of single crystals of similar materials has been reported in the literature (M. Uda, *Scientific Papers of the Institute of Physical and Chemical Research*, 62 (1968) 14). The fabrication of PN-junctions, however, requires the incorporation of P- and N-type dopants. Of the many possible P-type dopants Ag appears to be the best candidate as a cation substitution. As N-type dopants, In, Ga, Ti, Sn, and Si appear to be the best candidate as cation substitutions. N-type dopants of another class are anion substitutions such as Br and Cl.

We claim:

1. A material possessing both ferrimagnetic and semiconducting properties characterized in that the composition of said material is represented by the chemical formula $Fe_{1+x}Cr_{2-x}S_4$, where the composition variable, $x$, has a value from 0.1 to 1.9.

2. A circuit element comprising a body consisting essentially of a material possessing both ferrimagnetic and semiconducting properties together with conducting means for passing an electrical current therethrough characterized in that the composition of said material is represented by the chemical formula $Fe_{1+x}Cr_{2-x}S_4$, where the composition variable, $x$, has a value from 0.1 to 1.9.

3. Circuit element of claim 2 in which said composition variable, $x$, of the said material has a value greater than 0.3.

* * * * *